US007836505B2

(12) United States Patent
Ballard

(10) Patent No.: US 7,836,505 B2
(45) Date of Patent: Nov. 16, 2010

(54) ACCELERATED FILE SCANNING

(75) Inventor: Clinton L Ballard, Suquamish, WA (US)

(73) Assignee: eAcceleration Corporation, Poulsbo, WA (US)

( * ) Notice: Subject to any disclaimer, the term of this patent is extended or adjusted under 35 U.S.C. 154(b) by 1199 days.

(21) Appl. No.: 11/447,775

(22) Filed: Jun. 5, 2006

(65) Prior Publication Data
US 2007/0283439 A1    Dec. 6, 2007

(51) Int. Cl.
G06F 11/30 (2006.01)
G06F 12/14 (2006.01)
G06F 9/26 (2006.01)
G06F 9/34 (2006.01)

(52) U.S. Cl. ............................ 726/24; 713/188; 711/202
(58) Field of Classification Search .................. 726/24; 713/188; 711/202
See application file for complete search history.

(56) References Cited

U.S. PATENT DOCUMENTS

| | | | | |
|---|---|---|---|---|
| 4,349,875 A * | 9/1982 | Tada | ............................ | 711/135 |
| 4,394,733 A * | 7/1983 | Swenson | ......................... | 711/3 |
| 4,413,317 A * | 11/1983 | Swenson | ...................... | 711/114 |
| 4,425,615 A * | 1/1984 | Swenson et al. | ............. | 711/114 |
| 5,644,786 A * | 7/1997 | Gallagher et al. | ............. | 710/30 |
| 6,195,587 B1 * | 2/2001 | Hruska et al. | ................... | 700/2 |
| 6,535,891 B1 * | 3/2003 | Fisher et al. | ........... | 707/999.203 |
| 6,542,943 B2 | 4/2003 | Cheng et al. | | |
| 6,748,534 B1 | 6/2004 | Gryaznov et al. | | |
| 6,886,099 B1 | 4/2005 | Smithson et al. | | |
| 6,928,555 B1 | 8/2005 | Drew | | |
| 6,952,776 B1 | 10/2005 | Chess | | |
| 6,963,978 B1 | 11/2005 | Muttik et al. | | |
| 6,973,578 B1 | 12/2005 | McIchionc | | |
| 6,980,992 B1 | 12/2005 | Hursey et al. | | |
| 6,993,660 B1 | 1/2006 | Libenzi et al. | | |
| 7,020,895 B2 | 3/2006 | Albrecht | | |
| 2006/0080737 A1 * | 4/2006 | Freeman et al. | ................ | 726/24 |
| 2006/0185016 A1 * | 8/2006 | Sitze | ........................... | 726/24 |
| 2006/0221786 A1 * | 10/2006 | Komoda et al. | ............ | 369/47.1 |

* cited by examiner

Primary Examiner—Christian LaForgia
(74) Attorney, Agent, or Firm—Steven P. Koda, Esq.

(57) ABSTRACT

Files are tested for presence of a predefined data pattern, such as a virus definition. For each one file of a first plurality of files, physical address data is derived from logical address information. Also, an entry is made in a first data structure. The entry includes file information and the derived physical address data. For each one cylinder of a hard drive, the first data structure is tested to identify any files having file contents stored in the cylinder. When the testing determines that the first data structure includes an entry having physical address data corresponding to the one cylinder, a read operation I requested to read the cylinder. Such testing and reading is repeated to read in multiple cylinders in a generally sequential order. The cylinder content is stored in a buffer. File content is read from the buffer for each one file of a second plurality of files. The read file content is tested for the presence of the predefined data pattern.

9 Claims, 6 Drawing Sheets

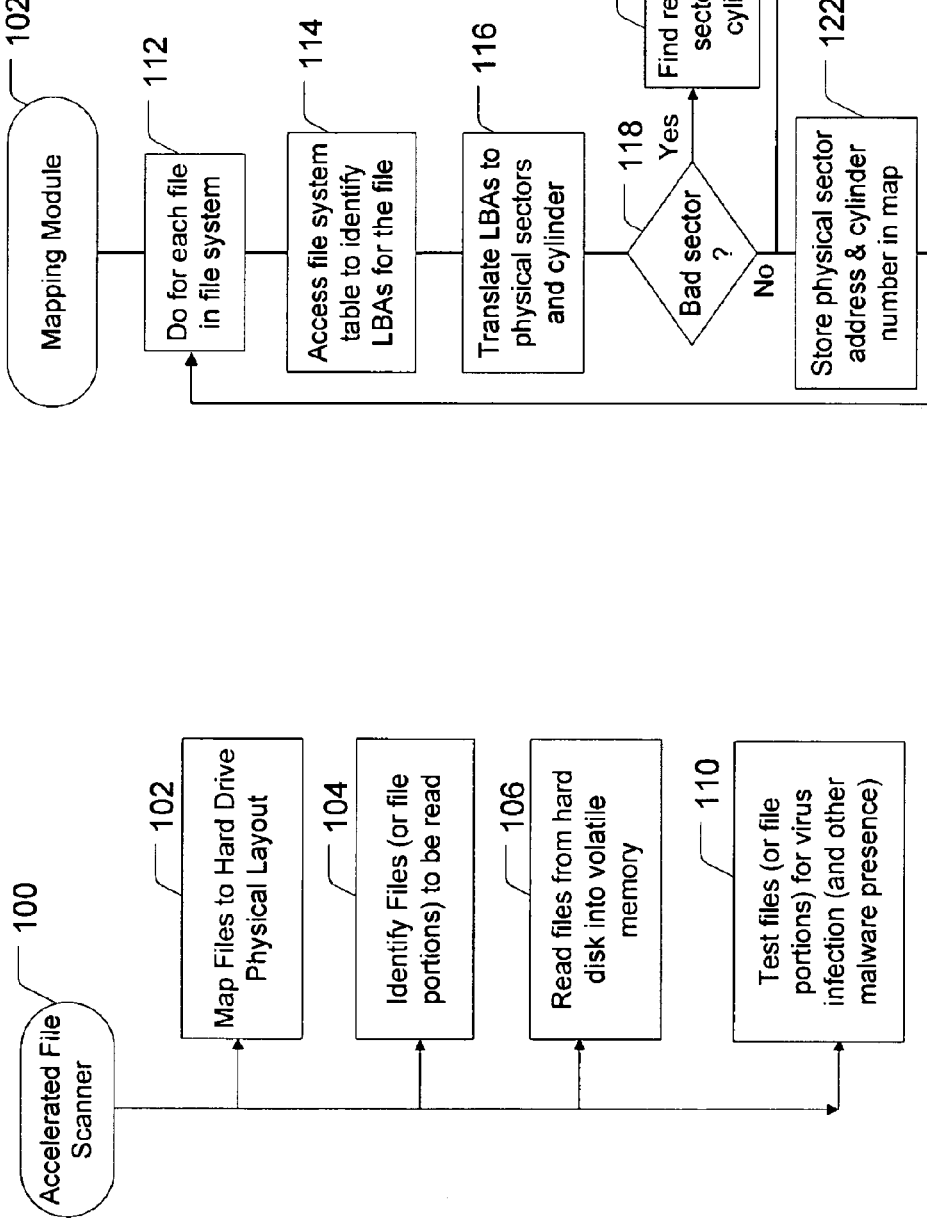

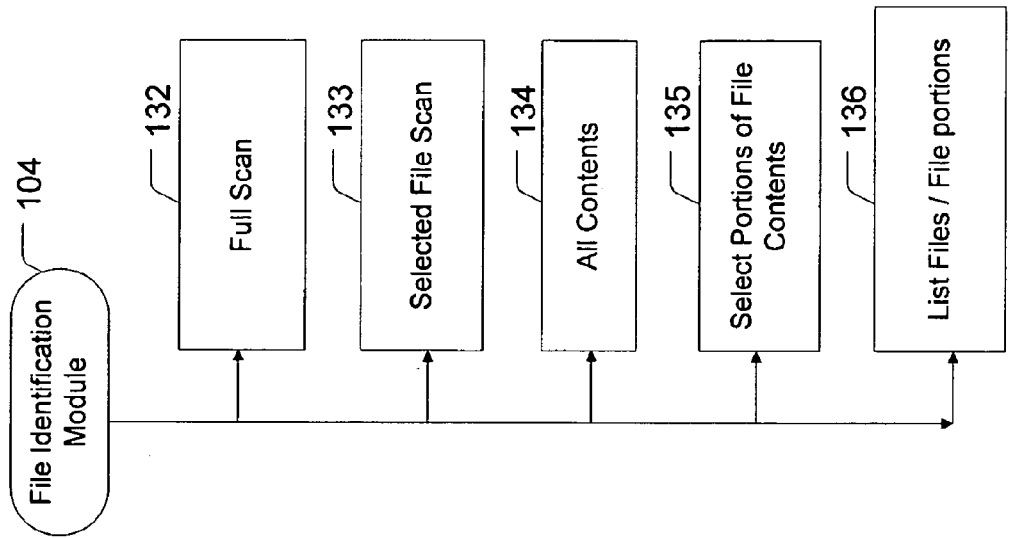

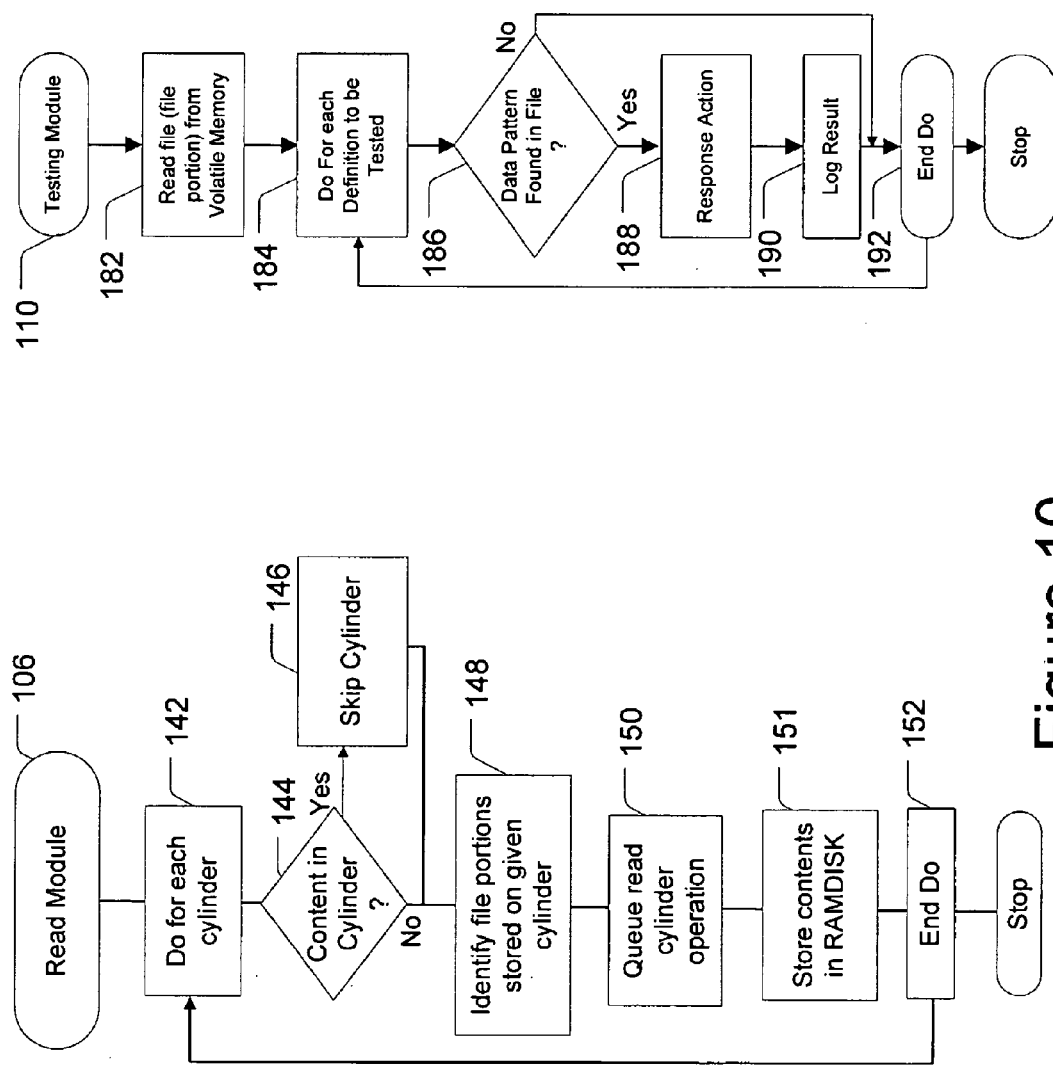

ated data scanner of FIG. 6;

ACCELERATED FILE SCANNING

FIELD OF THE INVENTION

This invention relates generally to the fields of file searching and data scanning, and more particularly to the field of scanning files and other stored digital objects for data patterns.

BACKGROUND OF THE INVENTION

File searching and data scanning are performed in many contexts. As internet communications proliferate and the need for digital security increases, an expanding context is malware cleaning software applications. The term 'malware' encompasses computer viruses and other 'infections', along with spyware, adware and other software having a malicious effect on the computer. Typical cleaning applications check digital objects on a computer against definition files, (e.g., virus definitions). Various objects that may become 'infected' or subjected to malicious software include, but are not limited to: files, directories, registry entries, Layered Service Providers (LSP's), file contents, services, running processes and modules, browser helper objects, and browser cookies.

Common processes performed in cleaning malware from a computer include: reading files from a hard disk drive; and comparing the files read against a plurality of malware definitions. To scan an entire hard disk may take an excessive amount of time. For example, a conventional 100 gigabyte hard drive having a media transfer rate of 20 megabytes per second, requires more than 1 hour just to stream the data from the disk. With added time for disks seeks and malware testing, substantially more time is required. In particular, testing all files and other digital objects for all malware definitions using a conventional scan engine takes an excessive length of time.

Accordingly, there is a need for accelerating the scanning of digital objects on a computer to test for malware definitions, and other data patterns.

SUMMARY OF THE INVENTION

The present invention provides a method of testing a plurality of files for a predefined data pattern. File contents of the plurality of files are read from a hard drive into a volatile memory buffer in a cylinder by cylinder streaming data manner. A determination is made as to when file contents to be tested for a given file are present in the buffer. Once present, the file contents for the given file are tested for presence of the prescribed data pattern.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 is a functional chart of modules for an embodiment of an accelerated file scanner;

FIG. 7 is a flow chart of a mapping module of the accelerated data scanner of FIG. 6;

FIG. 8 is a diagram of a file map generated by an embodiment of the mapping module of FIG. 7;

FIG. 9 is a flow chart of a file identification module of the accelerated data scanner of FIG. 6;

FIG. 10 is a flow chart of a read module of the accelerated data scanner of FIG. 6; and FIG. 11 is a flow chart of a testing module of the accelerated data scanner of FIG. 6.

DETAILED DESCRIPTION OF THE ILLUSTRATIVE EMBODIMENTS

In the following description, for purposes of explanation and not limitation, specific details may be set forth, such as particular computers, networks, communication systems, terminals, devices, components, techniques, data and network protocols, software products and systems, enterprise applications, operating systems, development interfaces, hardware, etc. in order to provide a thorough understanding of the present invention. However, it will be apparent to one skilled in the art that the present invention may be practiced in other embodiments that depart from these specific details. Detailed descriptions of well-known computing architectures, networks, communication systems, computers, terminals, devices, components, techniques, data and network protocols, software products and systems, operating systems, development interfaces, and hardware are omitted so as not to obscure the description of the present invention.

Further, embodiments of methods of the invention are described below in part with regard to flow charts. Such embodiments are to be performed by a computer executing one or more computer programs made up of data and computer-executable instructions. The flow charts enable one skilled in the art to develop computer program embodiments on variously configured computers. For example, for computer programs written in accordance with recognized standards, the computer program may be executed on a variety of hardware platforms and interface to a variety of computer operating systems. It will be appreciated that a variety of programming languages may be used to implement the method embodiments described herein. Also, when referring to software, (e.g., a program, process; procedure; module; application) as taking an action or causing a result, it is meant that one or more processors of a computer are executing program instructions on data to enable the computer to achieve such action or result.

Operating Environment

Figure 1:
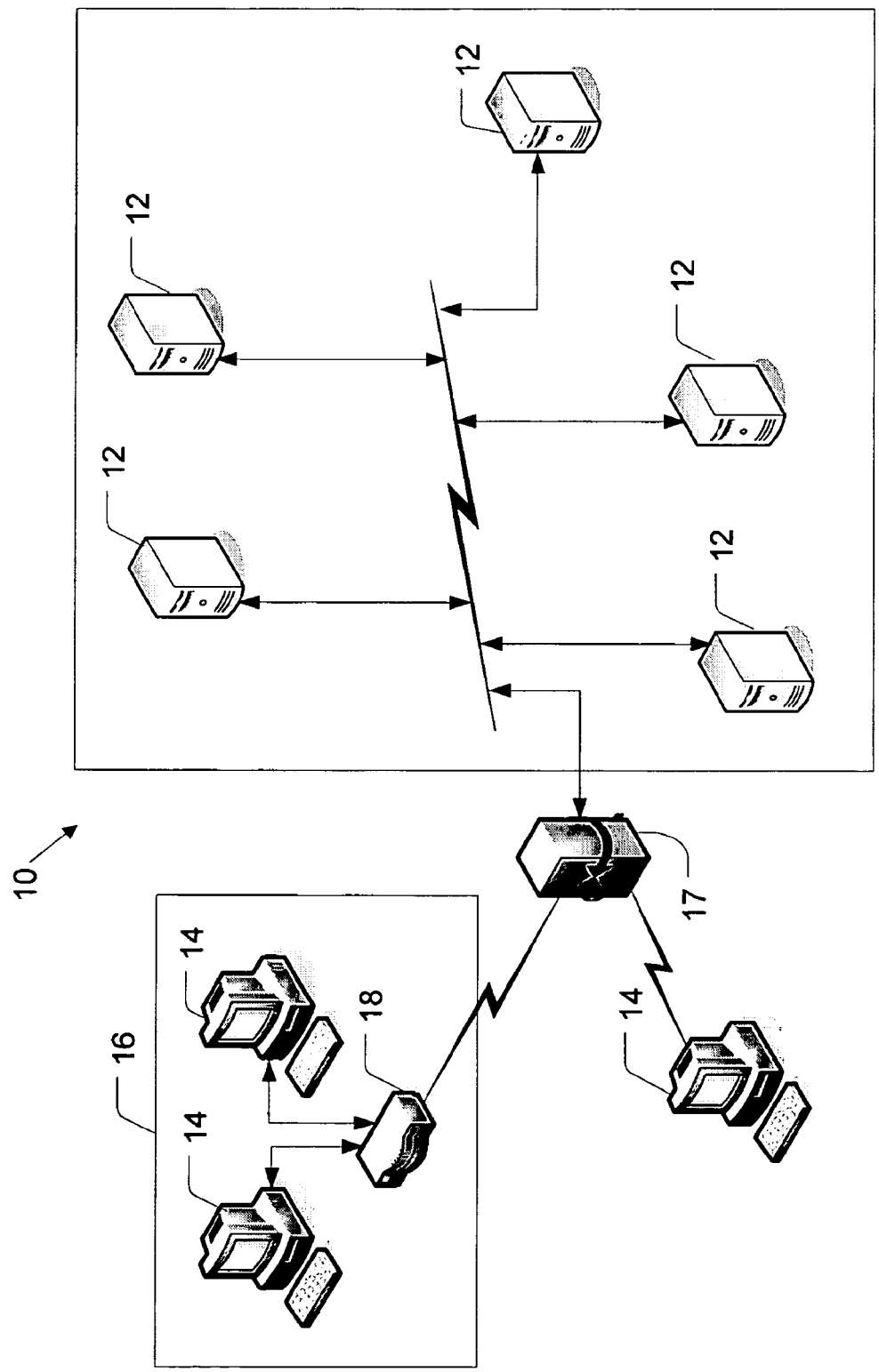
FIG. 1 is a block diagram of a wide area network environment which may host an embodiment of the present invention.
Figure 2:
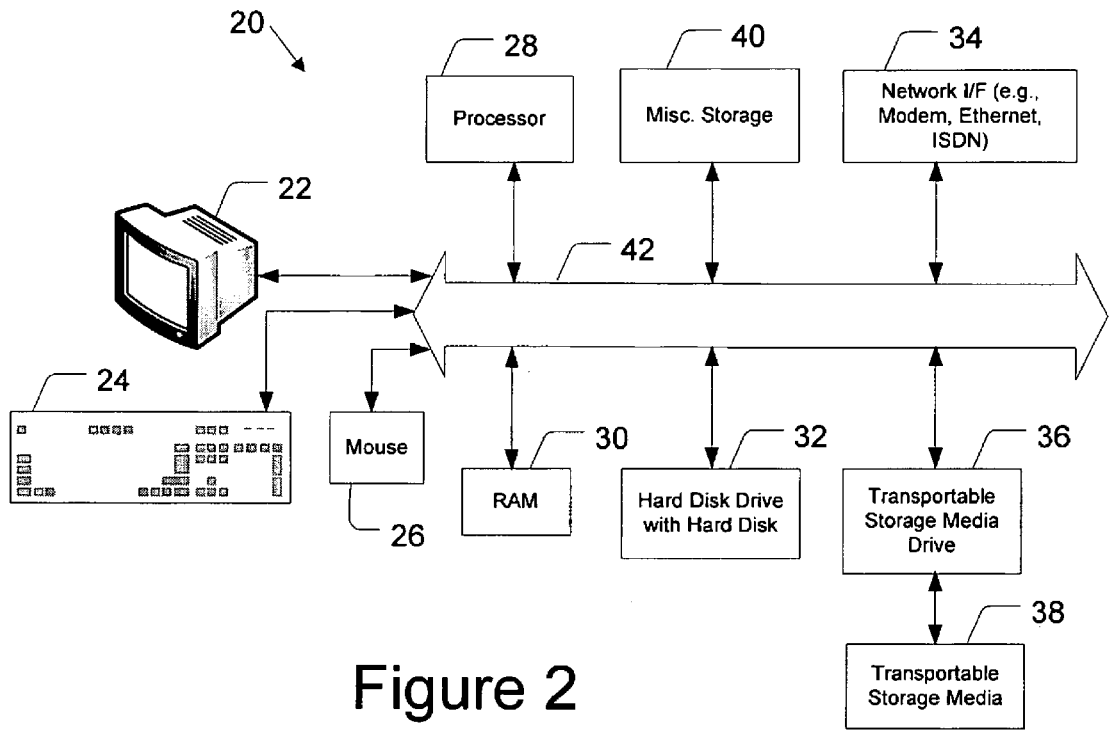
FIG. 2 is a block diagram of an exemplary computer system that may embody a user computer or server computer for hosting one or more processes described in the detailed description.
Figure 3:
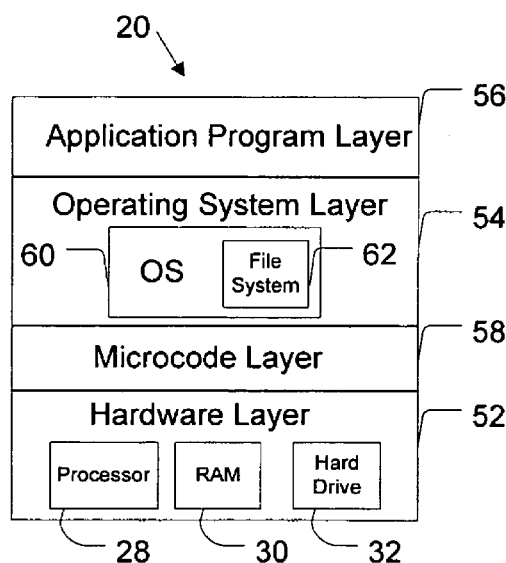
FIG. 3 is a block diagram of an exemplary computing platform for hosting one or more processes described in the detailed description.

FIGS. 1-5 are intended to provide an overview of an operating environment hosting various embodiments of the inventions. FIG. 1 depicts an exemplary network operating environment. FIGS. 2 and 3 depict an exemplary computer operating environment. These examples are not intended to limit the applicable operating environments. One of skill in the art will appreciate that embodiments of the inventions may be practiced on other network and computer configurations, including hand-held devices, multiprocessor systems, microprocessor based electronics, programmable consumer electronics, network computers, minicomputers, mainframe computers, and the like. Embodiments of the inventions also may be practiced in distributed processing environments, such as where tasks are performed by remote processors linked through a communication network.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network server computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term file as used herein, includes files (as per the Windows operating system usage and Linux operating system usage), documents (as per the MacOS operating system usage), pages (as per the web phraseology usage), digital objects, and records, entries or terminology used to describe a unit of a data base, a unit of a file system or a unit of another data collection type, whether or not such units are related or relational.

The network server computers 12 may be formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and establish a link to a gateway 18 (e.g., an a point of presence or aggregation point) for an IP or other wide area network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private or semi-private network using proprietary communication protocols.

The client computer 14 may be an end user computer, and may also be a mainframe computer, minicomputer or microcomputer having one or more microprocessors. Further, the client computer 14 may be a cell phone, smart phone, personal digital assistant or other computing device. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16. For example, computers 14 may be coupled to a router 17 which accesses the wide area network through a gateway 18.

FIG. 2 shows a computer system 20 including a processor 28, random access memory (RAM) 30, and a non-volatile storage device such as a hard disk drive 32. In addition, a computer system may include a display monitor 22, a keyboard 24, a pointing/clicking device 26, and a communication or network interface 34 (e.g., modem; ethernet adapter). In addition other devices may be included, such as a transportable storage media drive 36 which reads transportable storage media 38, or other miscellaneous storage devices 40, such as a floppy disk drive, CD-ROM drive, zip drive, bernoulli drive or other magnetic, optical or other storage media. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer. The computer system 20 may even be configured as a workstation, personal computer, network server, or a reduced-feature network terminal device. Further the computer 20 may be embodied as a cell phone, smart phone or personal digital assistant (PDA).

Referring to FIG. 3, the computer 20 includes a computing platform 50 having a hardware layer 52, an operating system layer 54 and an application program layer 56. A microinstruction code layer 58 also may be included for interfacing between the hardware layer 52 and the operating system layer 54. The operating system layer includes an operating system 60 which coordinates operation of the various hardware devices (e.g., see hardware devices of FIG. 2) that form the hardware layer 52. The operating system 60 also provides an operating environment for application programs and utilities running on the application layer 56. The operating environment includes various digital objects, such as files. A file system 62 is maintained as part of the operating system for controlling access to files stored on a non-volatile storage device 32. The file system includes a data structure which stores information about each file, such as file type, file identifier, file length, creation date, modification date, and other information.

Figure 4:
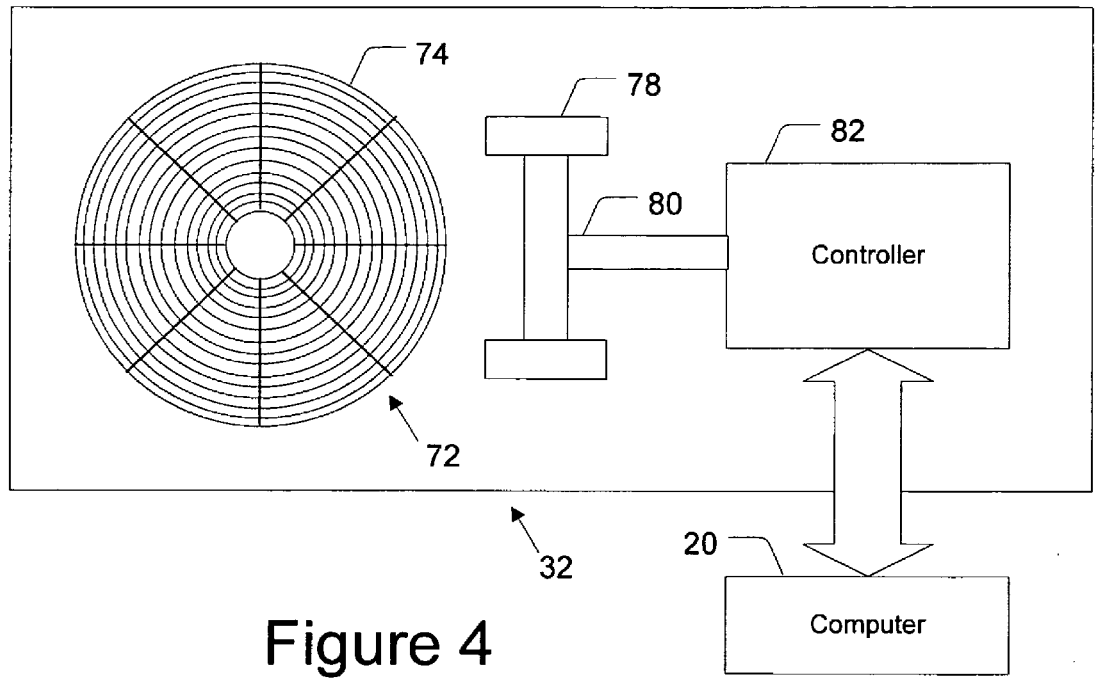
FIG. 4 is an illustration of a hard disk drive of FIG. 2.

The hard disk drive 32 may be an electromechanical device that reads from and writes to one or more hard disks. FIG. 4 shows a block diagram of a hard disk drive 32 including a hard disk 72. The hard disk 72 includes one or more disk platens 74 (e.g., 2 to 8; see FIG. 5). The main components of the drive 32 are a spindle 76 on which the platens 74 are mounted, a drive motor for spinning the platens, one or more read/write heads 78, a seek mechanism 80 for positioning the heads 78 over the platens 74, and a controller 82 which synchronizes read/write activities and transfers information to and from other components of a host computer system 20.

A hard disk platen 74 may be an inflexible platter coated with a material for allowing data to be recorded magnetically. A typical hard disk rotates at a constant velocity of approximately 3600 revolutions per minute. The read/write heads 78 ride over the surface of the disk platens on a cushion of air 10 to 25 millionths of an inch deep. The hard disk platens are sealed within the disk drive preventing contaminants from interfering with close head to disk tolerance.

In operation the host computer 20 may provide logical instructions to the disk drive 32 to read or write data into memory locations on the disk 72. Although the instructions typically include a logical address for the data, the data is not stored in logical format. The data is stored in a physical address location. The controller 82 typically translates the logical address into a physical address. Once the translation occurs the controller directs the heads 78 to the physical address location at which the desired data is stored or read. The time required to move a disk drive's read/write head 78 to a specific cylinder on a disk is referred to as the "seek time". The time required move the head and complete an I/O request for a data read/write operation is referred to as the "access time".

Figure 5:
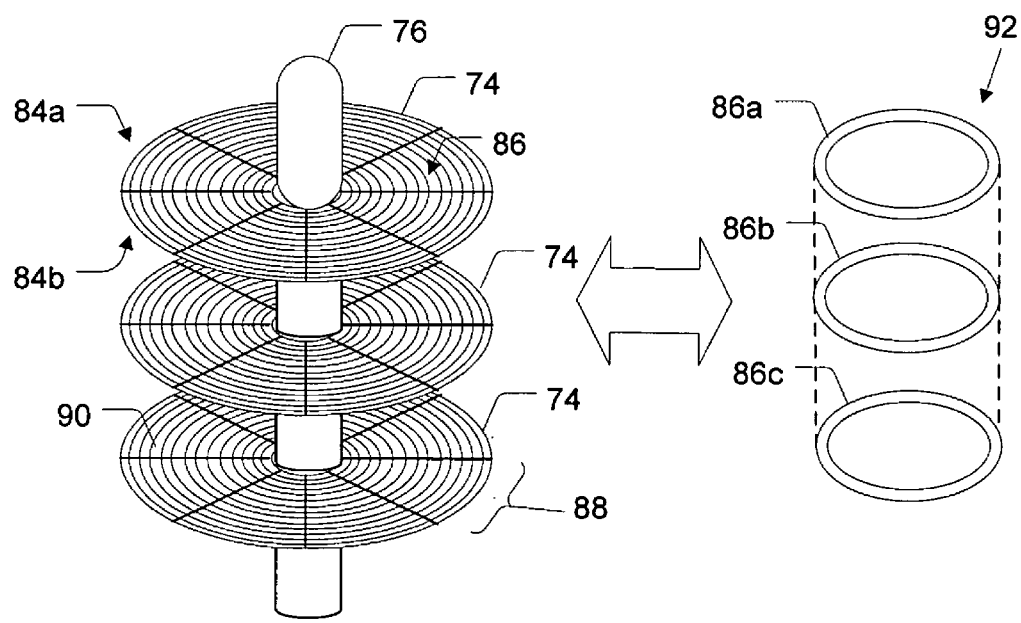
FIG. 5 is an illustration of a plurality of platens of the hard disk drive of FIG. 4, along with a cylinder formed by corresponding tracks of multiple platens.

FIG. 5 shows an isolated perspective view of a several hard disk platens 74, along with a cylinder 92 formed by corresponding tracks 86 of the multiple platens 74. The figure illustrates how data is physically organized and stored. Each side of a given platen 74 has a data storage surface 84. There are two data storage surfaces 84a,b (e.g., head 0 and head 1) per platen 74. Each surface 84 includes a plurality of concentric circles called "tracks" 86. The outermost track generally is designated as a first logical track (e.g., track 0). The innermost track is generally designated as the last track (e.g., track 999 on a 1000 track disk). The individual platens 74 are journalled about a single spindle 76 and physically stacked one above the other. The combination of like track numbers on each surface of each disk define a cylinder 92. For a hard drive having only one platen a cylinder is formed by the corresponding tracks on each surface of the platen. For a hard drive having only one platen which has only one surface, the term cylinder as used herein is the same annular ring which forms a track, (i.e., for purposes herein cylinder and track are synonymous for such case).

Each storage surface 84 also is divided into a number of pie-shaped "sectors" 88. The portion of a sector 88 within a given track 86 is referred to as a "segment" 90. In some embodiments each segment 90 may store 512 bytes of data and is accessed by a three coordinate physical address corresponding to the cylinder number, head number and sector number. Early disk drive systems included 17-44 sectors per track. Such number has increased to 100 sectors per track and higher using special data access techniques. In addition, modem disk drives take advantage of the greater circumferential length of outer tracks by including more sectors along outer tracks than along inner tracks. Such drives implement zone bit recording to store more sectors on tracks further away from a hard disk's center. Groups of adjacent cylinders 92 form a zone. A given zone has the same number of tracks 86 per cylinder 92 and the same number of sectors 88 per track 86. A different zone has a common number of sectors per track which is different than the number of sectors per track in other zones.

During operation the controller 82 receives a logical address and translates the address into physical cylinder 92, physical head and physical sector 88 components of a physical address. The controller then sends signals to move the heads 78 to the physical address.

Overview

The present invention is directed toward file scan engines and data search engines which may be part of the operating system layer 54 or be an application or utility executing as part of the application layer 56. The search engines read and test data structures, such as files and other digital objects, for specific data patterns. For example, in the field of malware cleaners, antivirus software scans digital objects to test against a set of virus (and other malware) definitions. The term 'malware' as used herein encompasses computer viruses and other 'infections', along with spyware, adware and other software having a malicious effect on the computer. Digital objects that may become 'infected' or subjected to malicious software include, but are not limited to: files, directories, registry entries, Layered Service Providers (LSP's), file contents, services, running processes and modules, browser helper objects, and browser cookies. For purposes of convenience, the processes herein are discussed in the context of files, antivirus software, computer viruses and infections. However, other digital objects also may be scanned and tested for other types of malware or other types of data patterns.

Antivirus software typically scans multiple files for multiple viruses. A virus definition is created for each virus to be tested. A given file is tested against multiple virus definitions. To check all files for all virus definitions takes a long time. Conventionally, each file is read from the hard drive and input to a scan engine which does the testing against the virus definitions. Reading all the files takes a long time, and processing the files against all the virus definitions takes a long time. Processing speeds keep getting faster, while hard drive media transfer rates have been relatively stable. Accordingly, reading the files off of the hard drive is a bottleneck in the overall process.

According to an embodiment of the invention, a method for reducing the number of hard drive seeks is provided which reduces the time to read in a plurality of files from the hard drive 32. In particular when reading in (i) all files, (ii) a large number of files, or (iii) portions of all or a large number of files, the read requests are grouped and queued in an order which reduces or minimizes hard drive seeks. An advantage of the method is that for certain cases the hard drive can be read at a speed approaching a hard drive data-streaming speed.

FIG. 6 shows a functional block diagram of an accelerated file scanner 100 according to one embodiment of the invention. The accelerated file scanner 100 performs several high level functions to perform an antivirus check or another data pattern search process. One function is to generate a map of the files stored on the hard drive. For example, a mapping module 102 may create a map correlating the logical block addresses at which a given file is stored to the actual physical sectors and cylinder(s) 92 at which the file is stored. In various embodiments, the map may include an entry for every file stored on the hard drive 32 or for a subset of files stored on the hard drive 32. In other embodiments there may be more than one entry for a given file. Further, the entry or entries for a given file may be for one or more portions of the given file, and encompass all portions or less than all portions of the given file. Although the map may store the physical sectors 88 and cylinders 92 for each given file, in some embodiments different or additional information may be stored to map the physical location of file contents to the hard drive. For example, the map may include any one or more of the following physical location informants: physical sector 88, segment 90, track 86, cylinder 92, and head. One of skill in the art will appreciate that other physical mapping parameters and other non-physical parameters also may be included in the map.

Another function of an embodiment of the accelerated data scanner 100 is to identify which files or file portions are to be read as part of an antivirus check or another data pattern search. For example, a file identification module 104 may create a list of files, file portions, digital objects or digital object portions to be read from the hard drive. For example, during one run an antivirus software application may scan every file on the hard drive, while on another run the antivirus application may scan less than every file on the hard drive. As an example, an antivirus application may scan merely those files that have been modified since a previous run during which the file was found to be clear of computer viruses. In another example, an antivirus application may scan less than the entire file. In the related application of Ballard et al., filed on May 11, 2006 for "Accelerated Data Scanning", application Ser. No. 11/432,651 a method is described by which portions of a file including the likely sites of infection are tested for viruses and other malware. Such application is incorporated herein by reference and made a part hereof.

Another function of the accelerated file scanner 100 is to read the files or file portions from the hard drive 32. For example a read module 106 may process the list of files to be read as generated by the file identification module 104 and copy file contents into a portion of volatile memory 30, such as into a RAMDISK. In one embodiment the read module 106 identifies all the files having file contents stored on a given track 86, or for a multi-platen hard drive, the files having contents stored on a given cylinder 92 of the hard drive 132. A read operation is queued to read in an entire track or multiple reads are queued to be performed in parallel for all or a portion of an entire cylinder (e.g., if the hard drive is designed to allow concurrents reads from each one of multiple aligned drive heads 78. The read operations for each portion to be read then are grouped by cylinder 92 so that all the data needed off of a given cylinder 92 is read during a single spin of the hard drive platens 74. Specifically, during a time when the hard drive heads 78 are positioned to read the given cylinder 92, the data for all files to be scanned having contents on such cylinder 92 is read. Of course, since the head 78 may not be positioned at the starting sector of a track 86 on the given cylinder 92, a second rotation may occur in cases.

In practice, the data may be read from a given cylinder 92 of a hard drive 32 at a speed approaching the hard drive streaming speed. In particular, the number of hard drive seek operations performed to read the file contents of a plurality of files is reduced. By reading contents off of the hard drive in an order at which the drive heads 78 move from cylinder 92 to cylinder 92, the number of seeks is further minimized.

In an ideal case, the hard drive heads 78 perform a single pass moving from cylinder 92 to adjacent cylinder 92 to read all the file contents required for a given antivirus scan. In practice, the hard drive head 78 may start the read operation at any cylinder 92, such as a middle cylinder. Thus, the drive head 78 may perform a seek operation when reaching one of the extreme cylinders to go back and read the cylinders on the other side of the starting cylinder. In the ideal case, the current cylinder 92 may be read in one or two rotations of the hard drive platens. In practice, the ideal case may not be achieved, although the number of passes to read all the cylinders 92 and the number of rotations to read a given cylinder 92 will be substantially reduced.

As a given track 86 or cylinder 92 is read, the file contents may be stored in a buffer. As multiple tracks 86 or cylinders 92 are read in turn, all the file contents of a given file that are to be tested or otherwise searched are read into the buffer. When all the file contents that are to be tested of a given file are stored in the buffer, the file (or file portions) is moved into volatile memory (e.g., RAMDISK).

To minimize the size of the buffer it is desirable to defragment the hard disk drive on occasion. The greater the degree of disk fragmentation, the larger the buffer that is desired to avoid overwriting the buffer before the file contents of a given file are written into volatile memory. To avoid having an excessively large buffer for cases of severe disk fragmentation, performance may be traded off. In one embodiment seeks may be inserted after scanning every certain number of cylinders 92 to obtain file contents not yet buffered for several given files. In another embodiment, a second pass over the cylinders 92 may be performed moving the heads 78 in an opposite direction relative to a first pass to obtain missing file content portions. For example, any missing file contents may be sorted in physical location order to be read during such second pass. Thus, during a first pass the drive heads 78 may move in a first radial direction, while in a return second pass, the drive heads 78 move in an opposite radial direction to read in the remaining or missed files, file portions, digital objects or digital object portions.

Note that if the first scan starts at a middle cylinder 92 away from an extreme inner or outer cylinder, then a first pass over a first portion of the platens 74 is performed while the heads 78 move in a first radial direction to an extreme edge of the platens 74. Once reaching the extreme, the heads 78 reverse direction to perform a second pass over the same first portion of the disk platens 74 while moving in a second radial direction (opposite the first radial direction). Once the starting cylinder is reached the heads 78 continue moving in the second radial direction to perform a first pass over the rest of the disks platens 74 (e.g., the second portion of the disk). Once reaching the other extreme, the heads 78 reverse to move again in the first radial direction and complete a second pass over the second portion of the disk platens 74.

Yet another function of the accelerated file scanner 100 is to test the read file contents against a prescribed data pattern or a plurality of data patterns, such as a set of virus definitions. For example, a testing module 110 receives the file contents from volatile memory 30 and searches the file contents for presence of the one or more data patterns.

In various embodiments the mapping module 102 is performed prior to a test run, and the map is updated as files are created, modified and moved. In addition the file identification module 104 also is performed prior to performing actual testing of file contents. In some embodiments the read module 106 may be performed in parallel with the testing module 110. In particular the file content read operations are queued and performed in one processing thread, while the file contents (of a previously read file) are being tested in another processing thread. As processing speeds continue to improve, it is expected that the testing thread will performing faster than the reading thread can provide file contents. An advantage of this invention is that the reading thread is being optimized to reduce potential wait times that may occur when performing tests and other searches of file contents.

Mapping Module 102

Referring to FIG. 7, the mapping module 102 may create a map 123 (see FIG. 8) correlating the logical block addresses at which a given file is stored to the actual physical sectors and cylinder(s) at which the file is stored. At steps 112, 124, a do loop may be established to perform processing for each file in the file system. In other embodiments, the processing may be set up to test each digital object, to process a select group of files, or to process a select group of digital objects. At step 114 the file system 62 (see FIG. 3) may be accessed to identify the logical block addresses at which the file is stored. In practice the file may be stored contiguously (e.g., on a defragmented disk) or may be stored discontinuously (e.g., when fragmented). When stored discontinuously, different LBA ranges may be present in the file system table for different blocks of the file.

At step 116, the logical block addresses are translated into physical sectors. At step 118, a bad sector table may be accessed to determine whether the data corresponds to a bad sector. At step 120, when a bad sector is identified, the remapped sector is identified from the bad sector table.

At step 122, the file identification, logical block, and physical sector address for the logical block are stored in the file map 123 (see FIG. 8) for each block of the file. The physical sector provides an indication of the track number at which a given file block (i.e., logical block) is stored. In addition, a cylinder number may be stored in the file map 123 for a given fie block. The steps 114 to 122 are repeated for each file being processed in the do loop. When complete, a map 123 serves as a physical location file sort data structure. In particular, the map 123 enables all files having a block of data stored in a given sector of the hard drive 32 to be identified.

File Identification Module 104

Referring to FIG. 9, the file identification module 104 may create a list of files, file portions, digital objects or digital object portions to be read from the hard drive. The list is generated at step 136. In different cases, the file identification module 104 may create different lists.

In case 132, a full scan of the hard drive 32 is to be performed by the test module 110. In such case 132, all the files may be listed at step 136. Although, in some embodiments in which all files are to be tested, a list is not needed. In particular the read module 106 and testing module 110 may perform steps without generating a file listing by the file identification module 103.

In case 133, less than all files of the hard drive are to be tested by the test module 110. In such case 133, a listing of a select group of files is generated at step 136. In case 134, all contents of the file are to be read and made available to the testing module 110. In case 135, less than all contents of files may be read and made available to the testing module. For example, in some embodiments critical portions of the file (e.g., likely sites of infection) may be read and tested, omitting non-critical parts. At step 136, a file list is generated listing the various files or file portions to be read.

Reading Module 106

Referring to FIG. 10, the read module 106 may process the list of files to be read (or a command to read all files) as generated by the file identification module 104, and copy the file contents into a portion of volatile memory 30, such as into a RAMDISK. At steps 142, 152, a do loop is established to perform processing for each cylinder 92 of the hard drive 32. At step 144, the map 123 is accessed to determine whether any data is being stored in the current cylinder 92. If the cylinder 92 is empty, then at step 146 the cylinder is skipped. When doing a full scan of the hard drive, if the map 123 includes any entries for the current cylinder 92, then at step 148 the file portions (e.g., file blocks) are identified. A read operation then is queued at step 150 to read the cylinder. When doing a scan for a select group of files, a subset of the map 123 may be tested so that only those entries for files to be tested are included when testing to see of the cylinder include file content (at step 144). If content is present then a read operation is queued at step 150 to read the cylinder content. When doing a scan for select portions of some or all files (e.g., critical areas), then in some embodiments a subset of the map 123 may be tested so that only those entries for file blocks which include the critical areas are tested at step 144.

The read operation may specify a starting logical block address (LBA) and ending logical block address within a given cylinder. The starting and ending block address may be selected to read in the entire cylinder or less than the entire cylinder. For example, where only a small contiguous portion of the cylinder includes data, then in some embodiments only such contiguous portion is specified. Where multiple portions of the cylinder include data, the empty gaps also may be read in some embodiments. In other embodiments a gap may be omitted when selecting the starting and ending logical block address.

In some embodiments the data stored on the hard drive is read cylinder by cylinder in a streaming data manner. By "streaming data manner" it is meant that for a given starting cylinder:

(i) data is read from the starting cylinder as the drive head moves along the cylinder, then (ii) the drive head advances in a given radial direction to a next cylinder having data to be read.

(iii) As the drive head reaches a starting sector on such next cylinder data is read from that cylinder as the head encounters each sector having data to be read, and (iv) the drive head advancing and reading (see (ii) and (iii) above) is repeated until an extreme cylinder (e.g., most inner or most outer depending on the radial direction in which the drive heads are moving) is reached.

Another streaming data operation then may be performed to read the remaining cylinders not read. For example, in the case where the starting cylinder is an intermediately located cylinder and the drive heads move toward the outer edge of the platens, another data streaming operation may be performed to read the cylinder concentrically inward of the intermediate cylinder at which the first data streaming operation began.

In some embodiments, the starting LBA for the read operation of a given cylinder is specified to optimize speed of reading adjacent cylinders. In particular, in some instances the ending LBA of the read of one cylinder and the beginning LBS of a read of the next cylinder may be located in a manner which requires a complete revolution of the hard disk when tracking to the beginning LBA of such next cylinder. By modifying the beginning LBA of a read operation designed to read a current cylinder, once the read is complete and the head moves to the next track/cylinder, the platens 74 are approximately at the beginning LBA for reading the next cylinder. Because all or much of the cylinder is being read the precise starting point is not important and can be modified to improve the speed at which data is read off of the hard drive 32. In another embodiment, a given read operation is queued to read multiple cylinders to avoid wasting revolutions of the platens 74 when moving from one cylinder to the next.

At step 151 the cylinder contents are stored in volatile memory 30, e.g., a RAMDISK. In some embodiments a buffer is maintained to receive the cylinder contents. Such contents may include all or a portion of one or more files. Specifically, the buffer stores blocks of file content. In embodiments where all of a given file are to be read, the test module 110 is called once the file contents are in the buffer. After such contents have been tested, the contents may be deleted, invalidated and/or overwritten. In embodiments where less than all of the file contents are to be read (such as when reading only the critical portions of the file), the test module 110 is called once the contents desired to be read are stored in the buffer. Similarly, such contents may be deleted, invalidated and/or overwritten once the contents have been tested.

In some instances there may be files that are too fragmented. In particular, the buffer may become full or a given file's partial contents overwritten before all of the desired content of the given file is read from the hard drive 32. In some embodiments, a routine is executed which tests optimization of the buffer. When it is determined that a write pointer into the buffer is approaching unread file contents, hard drive seeks may be injected to complete the reading of the desired file contents needed to accompany the unread file content soon to be overwritten. In another embodiment, the soon to be overwritten unread file contents are recopied into the buffer, or the buffer write pointer is adjusted to skip over the unread file contents so as not to overwrite such contents during this pass through the buffer. In still another embodiment, the unread file contents are permitted to be overwritten. In such case, the file is noted and may be read in during another pass of the hard drive. Specifically, read operations are queued during a second pass after a complete first pass read of the hard drive. During the second pass, files that were not properly read in during the first pass are read, (i.e., those files for which all the desired file content to be read was not read during the first pass).

Testing Module 110

Referring to FIG. 11, the testing module 110 receives the file contents from volatile memory 30 and searches the file contents for presence of one or more virus definitions. The test module may be a conventional antivirus test application, a conventional antivirus test engine (e.g., a portion of a conventional antivirus test application program), another antivirus test process or another data pattern testing process. As previously described, the term antivirus is used for convenience. Other types of malware also may be detected. Further, data patterns may be tested for a purpose other than to identify viruses and malware.

At step 182 the file or partial file contents are read from volatile memory 30, (e.g., a buffer maintained in a RAM-DISK data structure). At steps 184, 192 a do loop may be established to process the file contents for a given virus definition (or other data pattern). At step 186, a determination is made as to whether the data pattern is present in the file contents. If the data pattern is present, a response action is taken at step 188 and a result is logged at step 190. For an antivirus test module, the action taken at step 188 may include deleting the file, quarantining such file, or modifying such file (e.g., such as to delete the data pattern). The purpose of taking action is to stop or prevent harm to the computer (e.g., remove the computer "infection") that likely is being caused by the virus associated with the detected data pattern. A log of the results for each file may be maintained in a log. A log entry may for example, indicate that no infections were found for a tested file. A log entry may indicate that an infection was found and that action was taken, (e.g., the log may provide a name for the infection; the log may indicate what action was taken; the log may indicate whether the action taken was successful).

The accelerated file scanner modules may be executed at various times in various orders to achieve an effective antivirus scanner. For example, upon installation a brute force scan may occur in which a map 123 is generated and all contents of all files stored on the hard drive 32 are tested. At other times, the accelerated scanner may implement criteria to perform testing on a subset of files, such as those that have not been modified since last found to be free of infection or to perform testing for a reduced set of virus definitions (e.g., the most prevalent viruses known to be in circulation). At still other times, the accelerated file scanner may test merely the critical portions of all or a select list of files. Also, at various times the accelerated file scanner may be configured to test all digital objects or one or more categories of digital objects.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. It should be noted that some steps may be deleted, added or re-ordered. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A method of testing a plurality of files for a computer virus in which each file has one or more file portions, the method comprising:

generating a list of file portions with corresponding physical address data for file portions to be tested;

reading in data content corresponding to a set of multiple entries in the list of file portions, said reading performed in a data streaming manner consisting of up to three data streaming operations, comprising a first data streaming operation in a first drive head radial movement direction starting at a given cylinder and progressing to an extreme cylinder, followed by a second data streaming operation in a second radial movement direction starting from the extreme cylinder to an opposite extreme cylinder, and followed by a third data streaming operation in the first drive head radial movement direction starting from the opposite extreme cylinder; and testing the read data content against a set of virus definitions;

wherein each one of said up to three data streaming operations comprises:

testing a current cylinder to determine whether data content is for a file portion in said generated list;

for first data content corresponding to a file portion in said generated list, reading said first data content from the tested cylinder as the drive head moves along the tested cylinder when the tested cylinder is found to include said data first data content;

for second data content not corresponding to any file portion in said generated list, not reading said second data content from said tested cylinder;

advancing the drive head in a radial direction to a next cylinder; and repeating the testing, reading, not reading, and advancing for duration of said one data streaming operation.

2. A method for testing files for presence of a predefined data pattern, comprising:

for each one file of a first plurality of files, deriving physical address data from logical address information for said each one file;

for said each one file of the first plurality of files, creating one or more entries in a first data structure, each one entry of said one or more entries comprising file information and the derived physical address data for a file portion of said one file;

reading in data content corresponding to a set of multiple entries in the first data structure, said reading performed in a data streaming manner consisting of up to three data streaming operations, including a first data streaming operation in a first drive head radial movement direction starting at a given cylinder and progressing to an extreme cylinder, followed by a second data streaming operation in a second radial movement direction starting from the extreme cylinder to an opposite extreme cylinder, and followed by a third data streaming operation in the first drive head radial movement direction starting from the opposite extreme cylinder;

storing the read data content in a buffer;

reading file portions from the buffer for each one file portion of a second plurality of files, wherein the first plurality of files comprises at least the second plurality of files; and testing the read file content for presence of the predefined data pattern;

wherein each one of said up to three data streaming operations comprises:

testing a current cylinder to determine whether data content is for a file portion to be tested;

for first data content corresponding to a file portion to be tested, reading said first data content from the tested cylinder as the drive head moves along the tested cylinder when the tested cylinder is found to include said data first data content;

advancing the drive head in a radial direction to a next cylinder; and repeating the testing current cylinder, reading said first data content, and advancing for duration of said one data streaming operation.

3. The method of claim 2, further comprising:

after said storing and prior to said reading from the buffer, determining that file contents to be tested are present in the buffer.

4. The method of claim 3, further comprising after said determining calling a module which executes said testing for presence of the predefined data pattern.

5. The method of claim 2, in which said reading in a data content is executed in a first processing thread; and said reading from the buffer and testing the read file content are executed in a different second processing thread, the first and second processing threads executed in parallel.

6. The method of claim 2, wherein said predefined pattern corresponds to a virus definition.

7. The method of claim 2, wherein said predefined pattern corresponds to a malware definition.

8. The method of claim 2 wherein each one of said up to three data streaming operations further comprises for second data content corresponding to a file portion not to be tested, not reading said second data content from said tested cylinder; and wherein said repeating for said one data streaming operation comprises repeating the testing current cylinder, reading, not reading and advancing for duration of each said one data streaming operation.

9. A computer program embodied on a computer-readable storage medium for testing files stored on a hard drive for viruses, comprising:

a mapping code segment that generates a physical sectors map of the hard drive, the map including sector location of file contents of said stored files;

a platter read code segment that reads in data content, corresponding to a set of multiple files to be tested, in a data streaming manner using up to three data streaming operations, comprising a first data streaming operation in a first drive head radial movement direction starting at a given cylinder and progressing to an extreme cylinder, followed by a second data streaming operation in a second radial movement direction starting from the extreme cylinder to an opposite extreme cylinder, and followed by a third data streaming operation in the first drive head radial movement direction starting from the opposite extreme cylinder; and a pattern detection code segment that tests the read file portions against a plurality of virus definitions;

wherein said platter read code segment and said pattern detection code segment are executed in parallel, and wherein a data streaming operation of said platter read code segment comprises code for testing a current cylinder to determine whether data content is for a file portion to be tested, code for reading data content from the tested cylinder as the drive head moves along the tested cylinder when the tested cylinder is found to include data content for a file portion to be tested, code for advancing the drive head in a radial direction to a next cylinder; and code for repeating the testing code, reading code and advancing code for duration of said one data streaming operation.

* * * * *